Dec. 26, 1944.     G. MATTERSDORF     2,365,715
FRICTION BRAKE
Filed Jan. 5, 1942     3 Sheets-Sheet 1
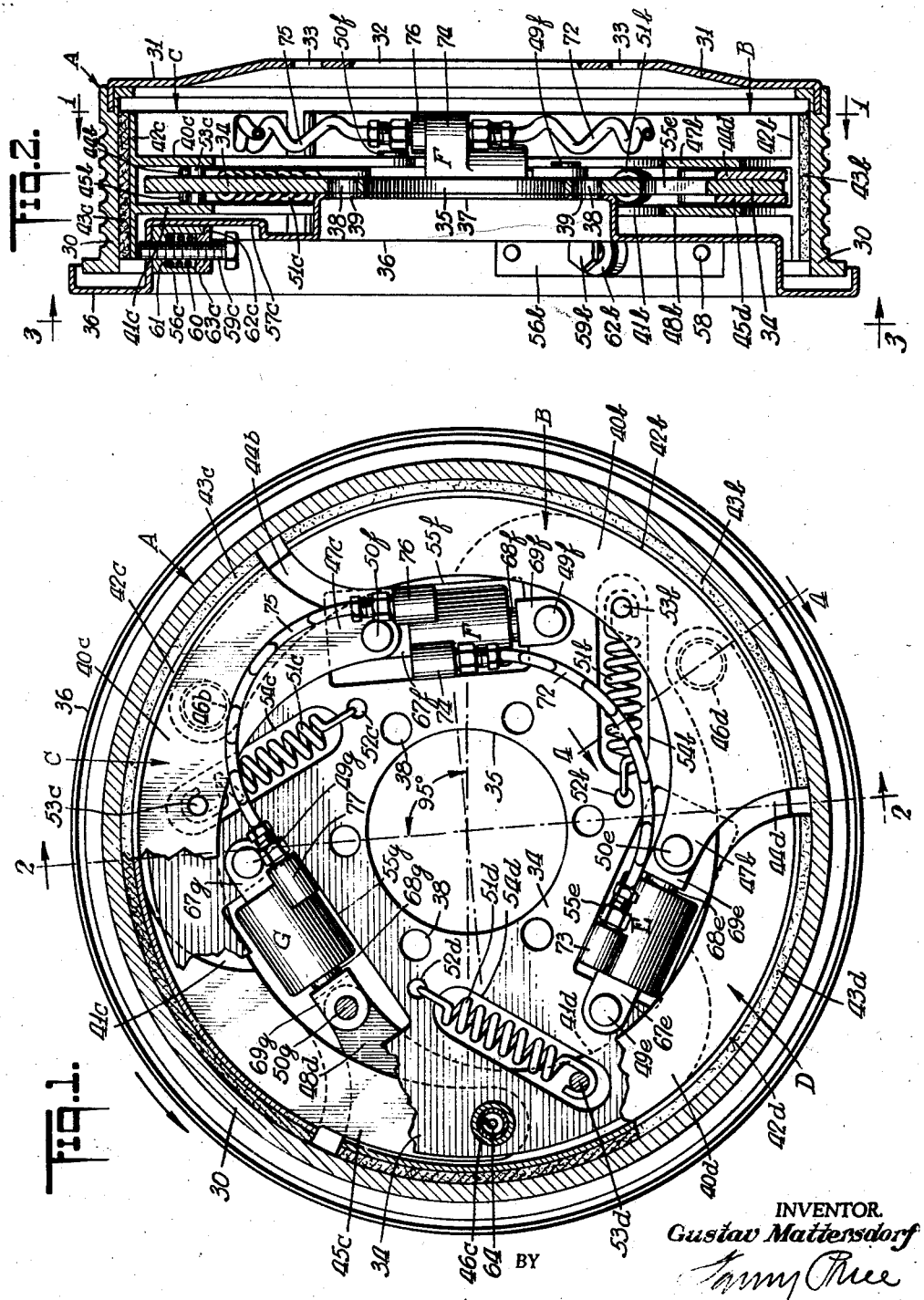
INVENTOR.
Gustav Mattersdorf
BY
ATTORNEY Dec. 26, 1944.　　　G. MATTERSDORF　　　2,365,715
FRICTION BRAKE
Filed Jan. 5, 1942　　　3 Sheets-Sheet 2
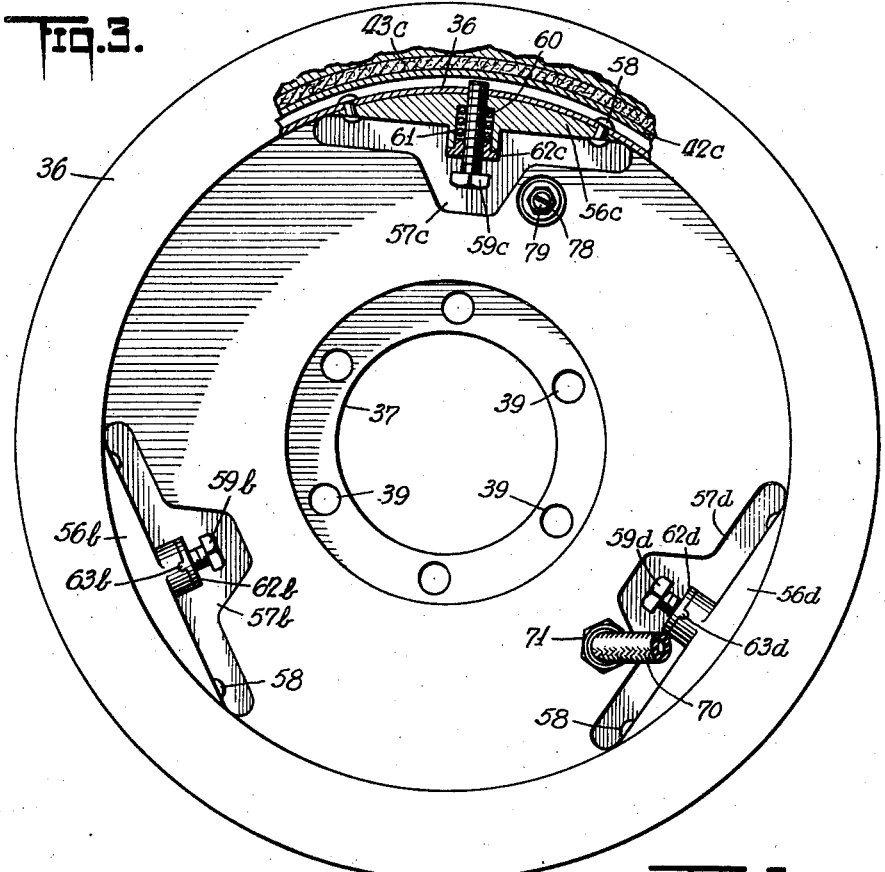
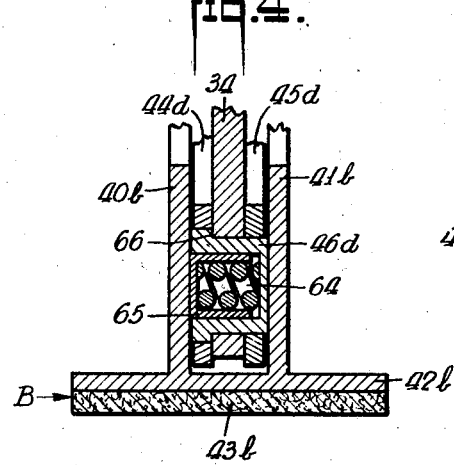
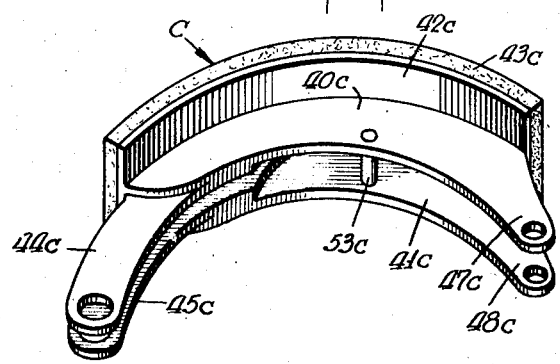
INVENTOR.
Gustav Mattersdorf
BY
ATTORNEY

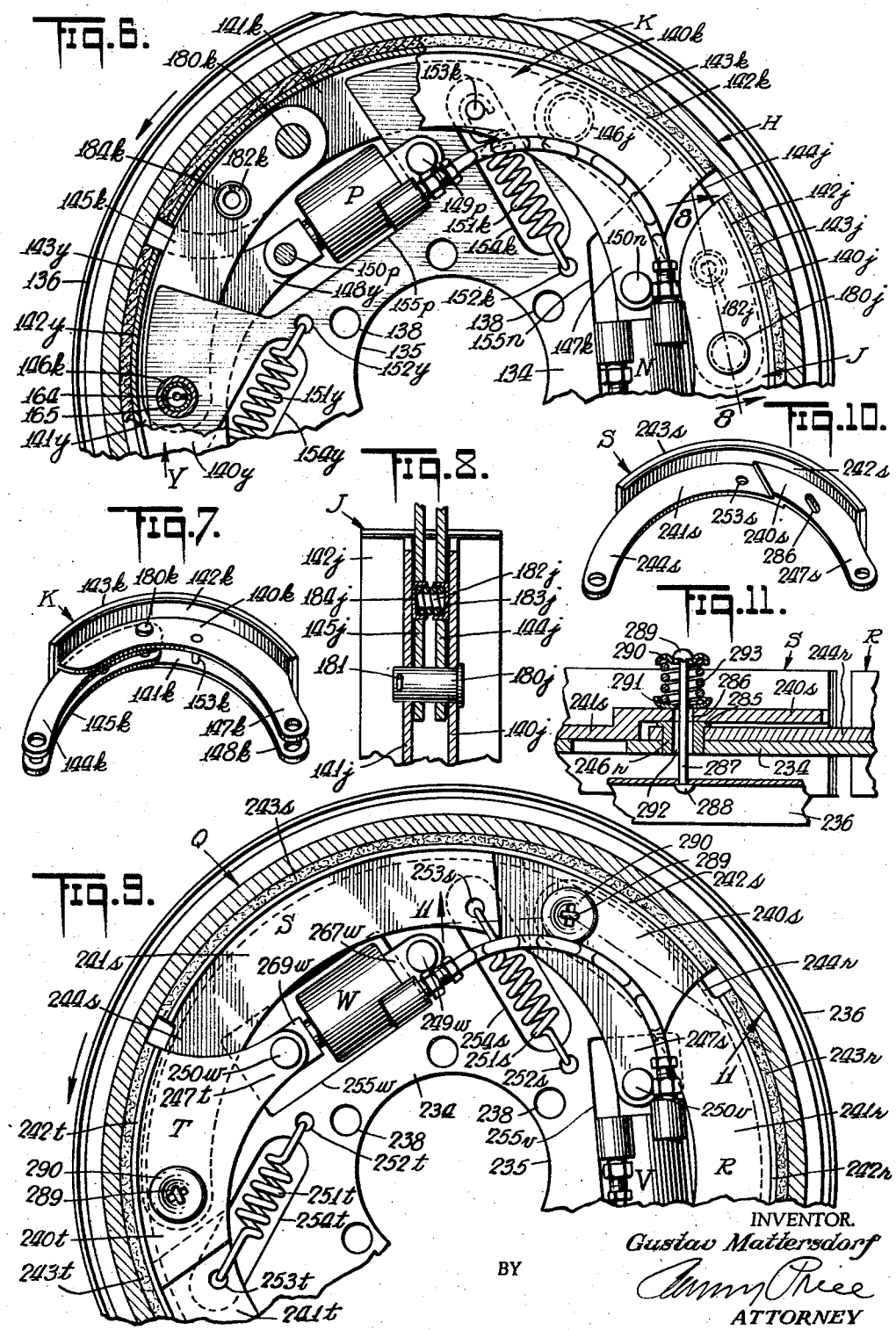

Patented Dec. 26, 1944

2,365,715

UNITED STATES PATENT OFFICE 2,265,715

FRICTION BRAKE

Gustav Mattersdorf, New York, N. Y.

Application January 5, 1942, Serial No. 425,655

17 Claims. (Cl. 188—78)

This invention relates to friction brakes in general and, more particularly, to brakes for automotive vehicles and aircraft.

Although this invention will be illustratively described in its application to hydraulically or liquid pressure operated internal brakes for automotive vehicles or aircraft, certain features herein presented are applicable as well to other types of brakes.

The constructions herein described are of the same general type as set forth in my Patent Number 2,171,585, issued September 5, 1939, as well as in my copending patent application Serial Number 293,021, filed September 1, 1939, now Patent Number 2,268,605, issued January 6, 1942. The present application is a continuation in part of the latter application and also of said earlier application which matured into Patent 2,171,585.

In brakes, a substantial portion of the total braking torque produced is due to so-called self-actuation. The forces acting on a shoe are the normal forces acting in a radial direction and the frictional forces acting in a tangential direction at the various points of contact. The frictional moments may assist or oppose the normal moments depending on the direction of rotation of the drum.

For any given brake shoe characteristics, such as the heel angle, the toe angle and the coefficient of friction between the lining and the drum, the degree of self-actuation depends on the position of the anchor pin or pivot axis. For a shoe which is self-actuating in forward motion, the nearer the pivot axis is placed to the center or axis of the drum, the larger are the frictional moments acting on the shoe and the more highly self-actuating the shoe becomes in forward travel.

In reverse travel, however, for the same shoe the more centrally the pivot axis is placed, the higher the negative frictional actuation becomes. Accordingly, for any given shoe characteristics and actuating force, any gain in braking torque in forward motion obtained by decreasing the pivot axis distance from the center of the drum is offset by loss in braking torque in reverse motion. One of the effects, therefore, of more centrally positioning the anchor pin is to increase the disparity between forward and reverse braking.

Increasing the pivot axis distance, that is, positioning the anchor pin further from the drum center and nearer the rim of the drum, has the opposite effect. The frictional moments being smaller, the degree of self-actuation is decreased in forward motion and the negative frictional actuation is decreased in reverse motion, thereby decreasing the disparity in braking torque as between forward and reverse motion.

As has been pointed out in the prior applications above referred to, it is desirable to have all the shoes self-actuating in forward motion since most of the travel and braking is in the forward direction and this arrangement is accordingly more efficient.

It has nevertheless been found desirable to position the anchor pin sufficiently far out from the center to permit use of linings having higher frictional coefficients, to decrease the disparity between forward and reverse braking and to provide adequate braking in reverse motion.

If the pivot axes are positioned too far inwardly toward the center, linings of low frictional coefficients must be used or the shoes may chatter or even become self-locking. The disparity between forward and reverse braking may be reduced by using linings of lower coefficients of friction, by positioning the pivot pin more outwardly or by both, assuming of course that the other shoe characteristics such as toe and heel angles remain the same.

It has been found desirable to use substantially symmetrical shoes, a symmetrical shoe being one in which the center of the contact arc is 90° remote from the pivot axis. In brakes having three or more substantially or approximately symmetrical shoes, the positioning of the pivot axes has presented a difficult problem due to the overlapping construction, whereby the pivot axis of a shoe is located within the sector of an adjacent shoe. If the pivot axes or anchor pins were placed too far out from the center, they would interfere with the webs or stiffening members of adjacent shoes and this would necessitate the use of shallow web members. This not only would weaken the construction of the shoe in general, but also would not afford optimum rigidity desirable to overcome shoe deformation due to heat or actuating stresses. In effect, in previous designs, the outward positioning of the anchorages was limited by the depth of the webs and conversely, the depth of the webs was limited by the position of the anchors.

One of the objects of this invention, therefore, is to provide in a multi-shoe brake of the type referred to, shoes having pivot axes positioned relatively remotely from the drum center in order to reduce the disparity between forward and reverse braking, to increase the braking torque in reverse motion and, if desired, to permit the use of linings having higher coefficients of friction.

A further object is to provide a multi-shoe brake of the type referred to of more substantial and sturdy construction, particularly having shoes with webs of increased depth and strength thereby better adapted to resist deformations due to heat and mechanical stresses.

Still further objects and advantages will appear from the more detailed description set forth below, it being understood, however, that this more detailed description is given by way of illustration, since various changes therein may be made by those skilled in the art without departing from the scope and spirit of the invention.

In accomplishing these objects, it has been most satisfactory according to one embodiment to arrange the web of a shoe or the webs of the shoes in overlapping or side by side relationship with the pivot mount of an adjacent shoe or the pivot mounts of the adjacent shoes.

The anchorage extensions or pivot arms of the shoes may be arranged in spaced pairs to straddle the support member or support plate, while they are in turn straddled by the parallel webs of the next shoe.

On the other hand, the webs and pivot arms of adjacent shoes may be single and offset in respect to each other and the support plate so as to be positioned in side by side relationship.

Or, if desired, combinations of double pivot arms on one shoe may be combined with single webs on the next shoe, or conversely a single pivot arm on one shoe may be combined with a double web on the next shoe.

In the above constructions the webs of the shoes have increased depth and strength without interfering with the anchorages of adjacent shoes and the anchorages of the shoes are positioned more closely adjacent the periphery of the drum.

Referring to the drawings which illustrate several of the various possible embodiments of the present invention, but to which the present invention is by no means restricted, since the drawings are merely by way of illustration and not by way of limitation:

Fig. 1 is a vertical side elevation, partly in section, of a three shoe brake mechanism illustrating one embodiment of my invention along the line I—I of Fig. 2;

Fig. 2 is a transverse section, substantially along line 2—2 of Fig. 1;

Fig. 3 is a vertical inside elevation from the line 3—3 of Fig. 2 showing the back of the embodiment portrayed in Fig. 1;

Fig. 4 is a fragmentary section on a larger scale as compared to Fig. 1 along the line 4—4 of Fig. 1;

Fig. 5 is a view in perspective of one of the brake shoes shown in Fig. 1;

Fig. 6 is a fragmentary vertical side elevation, partly in section, of another embodiment of my invention as applied to a three shoe brake;

Fig. 7 is a view in perspective of one of the brake shoes shown in Fig. 6;

Fig. 8 is a fragmentary section along the line 8—8 of Fig. 6;

Fig. 9 is a fragmentary vertical side elevation of still another embodiment of my invention as applied to a three shoe brake;

Fig. 10 is a view in perspective of one of the brake shoes shown in Fig. 9; and

Fig. 11 is a fragmentary section along the line 11—11 of Fig. 9.

In Figs. 1, 6 and 9, the arrows concentric with the drums indicate the direction of rotation corresponding to forward motion.

In Figs. 1 to 5 inclusive: A is a brake drum comprising a braking flange 30 and, securely attached thereto, a web 31 having a central opening 32 and holes 33 for attachment to a wheel, hub, axle or other part of a vehicle or machine to be braked.

A relatively fixed brake support member or torque plate 34 having central opening 35 and the brake backing plate 36 having central opening 37 are securely attached by bolts, rivets or suitable fasteners (not shown) to the axle housing, steering knuckle or other fixed part (not shown) through holes 38 and 39.

The three brake shoes B, C and D have flanges or soles 42b, 42c, and 42d to which latter are securely attached the lining or friction members 43b, 43c and 43d respectively. These shoes as shown are all frictionally assisted or self-actuating in forward motion. The shoes are provided with double stems or webs spaced somewhat apart, the outer members being designated by numerals 40b, 40c and 40d and the inner members by numerals 41b, 41c and 41d.

The shoes also have heel extensions comprising two parallel arms extending from the shoe webs but spaced more closely together. The outer members are designated by numerals 44b, 44c and 44d and the inner members by numerals 45b, 45c and 45d.

In each case, the inner and outer members straddle the torque plate as shown and extend into the sector of the adjacent shoe. The extensions are anchored or pivotally connected to the torque plate by anchor pins 46b, 46c and 46d.

The shoes B, C and D also have toe extensions comprising two parallel arms which are extensions of the shoe webs. Of the three outer members two are shown, designated by numerals 47b and 47c and the three inner members by numerals 48b, 48c and 48d. Since in Fig. 1, part of shoe D is broken away, only the inner member is shown whereas only the outer members are shown for the other two shoes. These extensions, being continuations of the shoe webs, are spaced more widely apart than the heel extensions of the adjacent shoes and therefore straddle the latter extensions.

The heel extensions which straddle the centrally located torque plate are in turn straddled by the shoe webs and toe extensions of respective adjacent shoes and are accordingly positioned both radially and laterally within the confines of such webs and toe extensions. This overlapping construction makes possible the extreme radial positioning of the respective anchor pins and further permits a very sturdy shoe construction employing deep webs. The construction of the anchor pins and related parts will be detailed hereinafter.

Actuating means for the shoes are provided in the hydraulic motors E, F and G, which are pivotally connected at one end to the torque plate by studs 49e, 49f and 49g respectively and at the other end to the respective toe extensions of the shoes B, C and D by studs 50e, 50f and 50g.

The three retractor springs 51b, 51c and 51d are connected at one end to the torque plate through holes 52b, 52c and 52d and at the other ends to their respective shoes by pins 53b, 53c and 53d. Suitable openings 54b, 54c and 54d are provided in the torque plate to accommodate these springs. Likewise suitable openings 55e, 55f and 55g are provided in the torque plate to accommodate the motors E, F and G.

Referring now particularly to Figs. 2 and 3, for a description of the clearance adjustment mechanism, 56b, 56c and 56d are housings secured to the backing plate by rivets 58, the backing plate being slightly recessed at 57b, 57c and 57d to accommodate the respective housings. The housings are threaded to receive the respective adjustment screws 59b, 59c and 59d. Centrally of the threaded portion, each housing is provided with a cylindrical bore 61 containing compression spring 60.

Caps 62b, 62c and 62d which are tapped to receive the threads of screws 59b, 59c and 59d, fit into and cover the respective bores. Projections 63b, 63c and 63d in the caps fit into corresponding recesses in the respective housings, thereby preventing the caps from turning.

The operation of the adjustment device is as follows: The spring is first inserted in the bore. With the cap held tightly in place against the action of the spring and with the notch in its proper place, the adjustment screw is threaded both through the cap and through the housing.

On taking the housing thread, the cap may have to be released slightly but it will be found that this will not be enough to raise the projecting notch out of its recess in the housing. When threaded through, the screw itself prevents the cap from moving in or out and the notch prevents the cap from turning. The threaded cap under action of the spring 60 acts as a lock washer and prevents turning of the screw except upon application of suitable leverage on the screw head as by a wrench.

As will be seen, the mechanisms are so positioned that the shoes in the released position of the brake abut against the respective screws. By turning the screws in or out the proper clearance adjustment is obtained both for initial adjustment purposes and to take up for wear.

It should be noted that all the shoes B, C and D and the anchor pins or studs 46b, 46c and 46d are identical in construction and are interchangeable.

Referring now particularly to Fig. 4 for a detailed description of the anchor assembly, it will be seen that the diameter of the outer portion of the anchor pin 46d is slightly larger than the diameter of the inner portion, thereby forming a shoulder 66 which abuts against the outer surface of the torque plate 34.

The anchor pin holes at the ends of the heel extensions are drilled accordingly. The anchor pin is drilled not quite through to receive a relatively strong compression spring 64 which is in turn enclosed by cap 65 which fits into the anchor pin bore.

First of all, it will be seen that the anchor pin is held in place laterally, even if it were of uniform diameter, by the overlapping webs of the adjacent shoe. In other words, its lateral motion is limited by such webs.

The mechanism shown, however, provides in addition an internal guiding or positioning means for the shoes to prevent lateral motion and rattling. In this connection, it should be noted that the lateral position of the torque plate is fixed. The lateral positioning of the heel extension arms 44d and 45d is provided for by providing a minimum clearance sufficient to straddle the torque plate, particularly in the region adjacent the anchor.

The region of the shoe toward the toe, being more remote from the fulcrum, is more susceptible to lateral motion and to wobble. In the design shown, the inner web 41b abuts against the inner surface of the anchor pin. Since some clearance will generally exist, the outer web 40b cannot abut firmly against the outer surface of the anchor pin and the spring actuated cap has accordingly been provided to offset this clearance. The force of the spring 64 against the inner portion or bottom of the anchor pin 46d keeps the shoulder 66 of the pin firmly in place against the torque plate, and by retaining the pin in place serves to prevent outward lateral motion of the shoe whereas the force of the spring tends to overcome any tendency toward inward lateral motion.

Inasmuch as the construction of motor assemblies E, F and G is substantially the same as the construction of the motors depicted and described in my copending application Serial Number 293,021, filed September 1, 1939, it is felt that no further detailed description of these units is here required.

It will be noted that motors E and G for shoes B and D have their respective casing ends pivotally connected to the torque plate by studs 49e and 49g passing through casing yokes 67e and 67g, while the piston ends are pivotally connected to the toe extensions of the shoes by studs 50e and 50g passing through piston yokes 69e and 69g.

For shoe C, however, the position of motor F is reversed, the casing end being pivotally connected to the toe extensions by stud 50f passing through the casing yoke 67f, while the piston end is pivotally connected to the torque plate by stud 49f passing through piston yoke 69f. In the position shown in Fig. 1, the piston rods 68e, 68f and 68g protrude from the respective motors E, F and G.

It will also be noted that the brake mechanism has been rotated slightly (about 5°) so that the axis of motor F is not quite vertical.

The yokes 67e, 69f and 67g connecting the motors with the torque plate straddle said torque plate whereas the yokes 69e, 67f and 69g connecting the motors with the shoes fit between and are straddled by the respective toe extension arms.

The inlet hose 70 leading from the master cylinder is connected to the lower port of motor E by coupling 71 (see Fig. 3). Flexible tubing 72 connects the upper port of motor E with the lower port of motor F through port extensions 73 and 74 respectively. Flexible tubing 75 connects the upper port of motor F with the lower port of motor G through port extensions 76 and 77 respectively. The upper port of motor G is normally plugged by bleeder plug 78 in which is inserted dust screw 79 (see Fig. 3).

It will be seen that through the various tubings, the motors are all interconnected and in fluid communication and will function simultaneously.

Since motors E, F and G are pivotally mounted, their casings or cylinders are constrained to move slightly as the brakes are operated and as the lining wears. This is particularly true of motor F whose casing is pivotally connected to the shoe.

It is advisable, therefore, to have the tubings connecting the motors of extra length to give sufficient flexibility to permit freedom of such motion without undue strain on the tubings themselves or on the related parts. A satisfactory degree of flexibility can be imparted to metal tubing by preshaping the tubing by curving or bending it laterally backwardly and forwardly in a sinuous manner, as shown at 72 and 75 in Fig. 2.

Figs. 6, 7 and 8 illustrate another embodiment of my invention which is substantially similar to the embodiment depicted in Figs. 1 to 5, except that the heel connections for anchoring the shoes are in the form of articulating links instead of extensions integral with or securely attached to the shoes.

With the exception of such links and related parts and with the further exception of a slightly different shape of the torque plate to accommodate such parts, this embodiment is identical with that previously described and accordingly does not require a very detailed description.

Referring to Figs. 6, 7 and 8: H is the brake drum, 136 the backing plate, and 134 the torque plate or support member having central opening 135 and attachment holes 138. The three brake shoes J, K and Y have flanges 142j, 142k and 142y respectively to which are secured lining or friction members 143j, 143k and 143y.

The shoes each have double parallel webs or stems. In Fig. 6 only the outer web 140j is visible for shoe J, whereas both the outer and inner webs are shown for shoes K and Y since the outer parts are partly broken away in this figure.

The outer webs are designated as 140k and 140y and the inner webs by numerals 141k and 141y for these latter shoes. The perspective view of shoe K, Fig. 7, clearly shows these webs.

It will be seen that all three shoes are so position as to be rendered self-actuating in forward motion.

These shoes J, K and Y, have toe extensions as in the embodiment previously described. Only the toe extensions for shoes K and Y are visible in Fig. 6. These extensions, comprising two parallel arms are actually extensions of the outer and inner shoe webs. In Fig. 7, the outer and inner members of the toe extensions for shoe K are designated as 147k and 148k respectively. Only the outer member for shoe K, namely 147k, is visible in Fig. 6 and only the inner member 148y for shoe Y.

Instead of integral heel extensions, the shoes have anchoring connections in the form of articulating links pivotally connected at one end to the shoes and at the other end to the torque plate. For each shoe, these links comprise two parallel arms positioned within the shoe webs but spaced sufficiently far apart to straddle the torque plate adjacent the anchorage. In Fig. 6 these links are only visible for shoes J and K, namely, outer member 144j for shoe J and inner member 145k for shoe K. Both outer and inner members 144k and 145k for shoe K are shown in Fig. 7, while in Fig. 8 outer and inner members 144j and 145j are shown for shoe J.

At the ends away from the shoes the links are pivotally connected to the torque plate 134 by anchor pins only two of which, 146j and 146k, are shown in Fig. 6. At their other ends, these links are pivotally connected to the shoes by studs 180j and 180k, each of which passes through the webs and link arms of the respective shoe and is held in place by suitable means, as by cotter pin 181 (see Fig. 8). Friction means between the link arms and the shoe webs are provided by springs 182j and 182k and spring caps 183j and 184j (see Figs. 6 and 8).

Inner spring cap 184k may also be seen in Fig. 6.

Actuating means for the shoes are provided by suitable hydraulic motors as, for example, motors N and P in Fig. 6, which are pivotally connected at one end to the torque plate 134 as by stud 149p and at the other end to the respective toe extensions as by studs 150n and 150p.

Retractor springs, such as 151k and 151y are provided which are connected at one end to the torque plate through holes 152k and 152y and at the other ends to their respective shoes as by pin 153k on shoe K. Suitable openings such as 154k and 154y are provided in the torque plate to accommodate the springs.

The torque plate 134 is likewise cut away as at 155n and 155p to accommodate motors N and P. These cut outs are somewhat different than in the embodiment first described to provide space for link studs 180j and 180k and for friction springs 182j and 182k and their related caps.

The anchor pins and all other parts and mechanism are the same as in the first embodiment depicted in Figs. 1 to 5 and need not be further described. Anchor pin spring 164 and cap 165 are shown in Fig. 6.

Figs. 9, 10 and 11 illustrate still another embodiment of my invention which is substantially similar to the embodiment shown in Figs. 1 to 5 except for single webs, heel extensions and toe extensions for the shoes instead of double parallel members.

Referring to Figs. 9, 10 and 11: Q is the brake drum, 236 the backing plate and 234 the torque plate or support member having central opening 235 and attachment holes 238. There are three brake shoes, R, S and T, all self-actuating in forward motion and having flanges 242r, 242s and 242t respectively, to which are secured lining or friction members 243r, 243s and 243t.

The shoes each have a single web 241r, 241s and 241t located centrally with respect to the flange and extending partly toward the toe portions. Beyond this place the web is offset more outwardly in a different lateral plane as will be seen at 240s and 240t in Fig. 9 and 240s in Figs. 10 and 11.

The shoes also have toe extensions as at 247s and 247t which are continuations of the outer offset portions 240s and 240t of the webs and accordingly comprise only single arms.

The shoes also have heel extensions, such as 244r and 244s, which are continuations of the inner or more central portions of the webs 241r and 241s and which accordingly likewise comprise only single arms. These heel extensions adjacent their ends away from the shoes are anchored or pivotally connected to the torque plate 234 by suitable anchor pins such as at 246r.

As will be seen more clearly in Fig. 11, the inner surface of the heel extension 244r of the shoe R, particularly adjacent the anchorage, bears against the torque plate 234, the anchor pin 246r passing through both the heel extension and the torque plate. The toe extension 247s and a portion of the web, 240s, of the shoe S are offset laterally to provide clearance for the said heel extension and the anchor pin. The anchor pin 246r which may be securely mounted in torque plate 234, has a head 285, thereby forming a shoulder which abuts against the heel extension 244r which limits the inward motion of the anchor pin. The outer offset portion of the web, 240s, bears against the outer surface of the anchor pin thereby retaining the pin in position and at the same time limiting the inward lateral motion of the shoe S.

Separate guiding and positioning means are provided to limit or prevent outward lateral motion of the shoe S. This comprises a compression spring 293 fitted between spring cups 290 and 291 retained in position by pin 287 passing through slot 286 in web 240s (see also Fig. 10) and through a hole 292 drilled through the anchor pin 246r and having a head 288 supporting it against the backing plate 236. The outward portion of the pin 287 has a flattened projection 289 which may be turned to release the cups and springs, suitable slots being provided in the cups for this purpose.

Inner cup 291 bears against the outer surface of web 240s. The cup being under the force of the spring 293 serves to prevent outward lateral motion of the shoe and prevents rattling. It should be noted that the slot 286 in the web should preferably be cut on circular lines centered at the axis of the anchor pin of shoe S (see Figs. 9, 10 and 11) to permit radial motion of the shoe during operation and still provide a sufficient bearing for spring cup 291.

The other shoes have corresponding parts of similar construction.

Actuating means for the shoes are provided by suitable hydraulic motors such as motors V and W in Fig. 9. These motors are pivotally connected at one end to the torque plate 234 as by stud 249w and at the other end to the respective toe extensions as by studs 250v and 250w. It should be noted that in this embodiment, instead of using yokes for the motor connections to the torque plate and toe connections as in the previous embodiments, single arms are employed. These arms are laterally in line with the motor axis.

Thus in Fig. 9, arm 267w bears against the outer face of the torque plate, whereas arm 269w bears against the inner face of the toe extension 247t as shown. This arrangement is provided to accommodate the offset construction heretofore described.

Retractor springs such as 251s and 251t are provided which are connected at one end to the torque plate through holes 252s and 252t and at the other ends to their respective shoes S and T through holes 253s and 253t in the respective webs of the shoes. Suitable openings such as 254s and 254t are provided in the torque plate to accommodate the springs. Suitable cuts or openings such as 255v and 255w are likewise provided in the torque plate to accommodate the motors.

The motors, tubings and related parts are the same as in the first embodiment depicted in Figs. 1 to 5 and accordingly require no further description.

In the specification and claims, the terms "pivot arm" and "extension arm" include the integral or rigid extensions 44b and 45b of shoe B, 44c and 45c of shoe C, and 44d and 45d of shoe D of the embodiment depicted in Figs. 1 to 5 as well as the articulating links, such as 144j and 145j of shoe J and 144k and 145k of shoe K, of the embodiment depicted in Figs. 6 to 8 and also the integral or rigid extensions, such as 244r of shoe R and 244s of shoe S, of the embodiment depicted in Figs. 9 to 11.

It is to be understood that many alternative and varying constructions may be made pursuant to the broad aspects of the present invention, as above pointed out, and it is intended to cover and include all such alternatives and variations as come within the scope of the appended claims.

What is claimed is:

1. A friction brake having a rotatable brake drum, a relatively fixed support, at least three brake shoes positioned successively in substantially the same circumferential path and having contact portions for engagement with said drum, each of said shoes also having a pair of spaced pivot arms pivotally connected to said support within the sector of the engaging surface of an adjacent shoe, said pivot arms straddling said support adjacent said pivotal connection, each of said shoes also having a pair of inwardly extending web members spaced somewhat more apart than said pivot arms so that the web members of each shoe straddle the pivotal connection and pivot arms of an adjacent shoe in the region of said pivotal connection and fluid operated motors located internally of the drum for operating said shoes.

2. A friction brake having a rotatable brake drum, a relatively fixed part, a plurality of brake shoes for frictional engagement with said drum, at least one of said shoes having a pivot arm pivotally connected to said fixed part by means of an anchor member within the sector of an adjacent shoe, said adjacent shoe having a pair of spaced inwardly extending webs overlapping said pivot arm and said anchor member, and spring means associated with said anchor member reacting against one of said webs to resist lateral motion of such web toward said anchor member.

3. A friction brake having a rotatable brake drum, a mount, and a plurality of brake shoes each provided with spaced web portions partially straddling said mount, each of said shoes being anchored by an anchor pin to said mount, the anchor pin for each of said shoes being straddled and laterally confined by the spaced web portions of another of said shoes.

4. A friction brake having a rotatable brake drum, a plurality of brake shoes for engagement with said drum, at least one of said shoes having a pair of spaced, inwardly extending web portions, a mount member partially straddled by said web portions, at least one other shoe being anchored to said mount by an anchor fastener, said fastener being wholly between and confined by the web portions of said first mentioned shoe, and means for actuating said shoes into engagement with said drum.

5. A friction brake having a rotatable brake drum, a support, a plurality of circumferentially adjacent brake shoes at least three in number for frictional engagement with said drum, each of said shoes having a separate and independent pivotal anchorage on said support, each shoe having a pair of inwardly extending web portions partially overlapping and straddling said support, said web portions also completely straddling the pivotal anchorage of an adjacent shoe, and means for operating said shoes.

6. A friction brake having a rotatable brake drum, a mount, a plurality of brake shoes positioned successively in substantially the same rotational path within said drum, at least one of said shoes being provided with a pair of spaced arms straddling said mount within the sector of an adjacent shoe, an anchor pin pivotally connecting said arms with said straddled mount, said pin being provided with a shoulder abutting said mount and thereby limiting its lateral motion in one direction, said adjacent shoe being provided with a pair of spaced, inwardly extending webs overlapping said arms and anchor pin and confining said anchor pin, said anchor pin having a recess provided with a compression spring reacting against one of said webs to resist lateral motion of said web toward said pin, and means for operating said shoes.

7. A friction brake having a brake drum, a mount, and a plurality of brake shoes positioned successively in substantially the same circumferential path within said drum, at least one of said shoes being pivotally connected to said mount by an anchor pin within the sector of an adjacent shoe, said adjacent shoe having an inwardly extending web overlapping said pivotal connection, and resilient means contained within said anchor pin and reacting against said web to resist lateral motion of said web toward said anchor pin.

8. A friction brake having a rotatable brake drum, a mount, a plurality of adjacent brake shoes positioned successively in substantially the same rotational path within said brake drum, each of said shoes having a pair of spaced arms straddling said mount within the sector of an adjacent shoe and an anchor pin within said sector pivotally connecting said straddling arms with said mount, each shoe also being provided with a pair of spaced webs straddling the pivotal connection of an adjacent shoe and confining the related anchor pin, and means for operating said shoes.

9. A friction brake including a brake drum, a mount, and three brake shoes having engaging surfaces in substantially the same rotational path, each of said shoes having a separate and independent pivot axis on said mount, each shoe also having an inwardly extending web within the sector of its engaging surface, said web partially overlapping said mount, the pivot axis of one shoe being located substantially within the sector of the engaging surface and within the radial limits of the web of the second shoe, the pivot axis of said second shoe being located substantially within the sector of the engaging surface and within the radial limits of the web of the third shoe, the pivot axis of said third shoe being located substantially within the sector of the engaging surface and within the radial limits of the web of said first mentioned shoe.

10. A friction brake having a rotatable brake drum, a mount, and three brake shoes positioned successively in substantially the same rotational path and having contact portions for engagement with said drum, each of said shoes also having a pivot arm pivotally connected to said mount, the pivot arms of all the shoes extending from their respective shoes in the same rotational direction, each of said shoes also having within the sector of its contact portion an inwardly extending web partially overlapping said mount, the axis of the pivotal connection of one shoe being located substantially within the sector of the engaging surface of a second shoe, the axis of the pivotal connection of said second shoe being located substantially within the sector of the engaging surface of the third shoe, the axis of the pivotal connection of said third shoe being located substantially within the sector of the engaging surface of said first mentioned shoe, the web of said first mentioned shoe overlapping the pivotal connection and pivot arm of said third shoe in the region of said pivotal connection, the web of said third shoe overlapping the pivotal connection and pivot arm of said second shoe in the region of said pivotal connection and the web of said second shoe overlapping the pivotal connection and pivot arm of said first shoe in the region of said pivotal connection.

11. In a friction brake, in combination, a rotatable brake drum, a mount positioned in a lateral plane within said drum, and a plurality of brake shoes, at least three in number, having contact surfaces positioned in substantially the same rotational path within said drum, each of said shoes having an arm extending in another lateral plane and in the same rotational direction into the sector of the contact surface of a succeeding shoe, said arms being provided with individual and separate pivotal anchorages on said mount within the sectors of the contact surfaces of succeeding shoes, each of said shoes also being provided within the sectors of their contact surfaces with a web, said webs being all positioned in still another lateral plane and extending inwardly beyond the respective anchorages of preceding shoes and partially overlapping said mount.

12. A brake including a rotatable brake drum, a mount within said drum positioned in a plane at right angles to the axis of said drum, and at least three brake shoes positioned successively in substantially the same circumferential path and having contact portions for engagement with said drum, each of said shoes also having a pivot arm pivotally connected to said mount within the sector of the contact portion of the succeeding shoe, said arms all being positioned in a second plane parallel to the plane of said mount, each of said shoes also having a web, the webs of all shoes being positioned in a third plane parallel to the other two planes and extending inwardly so that the web of each shoe partially overlaps the mount and also overlaps the pivotal connection and pivot arm of the preceding shoe in the region of said pivotal connection.

13. A brake having a rotatable braking member, a mount, a plurality of brake shoes at least three in number arranged successively in substantially the same rotational path, each of said shoes having a pair of spaced and inwardly extending web members partially straddling said mount, each of said shoes having an anchorage on said mount within the sector and between the spaced web members of a succeeding shoe, the anchorages for all the shoes being positioned from the shoes in the same rotational direction, and means for operating said shoes.

14. In a friction brake, in combination, a rotatable brake drum, a mount, and at least three brake shoes positioned successively in substantially the same circumferential path and having contact portions for engagement with said drum, each of said shoes also having a pivot arm pivotally connected to said mount within the sector of the contact portion of the succeeding shoe, said pivot arm overlapping said mount adjacent said pivotal connection, each of said shoes also having an inwardly extending web member so positioned that the web member of each shoe partially overlaps the mount and also overlaps the pivotal connection and pivot arm of the preceding shoe in the region of said pivotal connection.

15. In a friction brake, in combination, a rotatable brake drum, a relatively stationary mount, and at least three brake shoes positioned successively in substantially the same rotational path within said drum and having arcuate contact surfaces for frictional engagement with said drum, each of said shoes having a separate and individual pivotal anchorage on said mount within the sector of the engaging surface of the succeeding shoe, the anchorages of all shoes being located in the same rotational direction from the respective contact surfaces so that all shoes are self-actuating in the same direction of drum rotation, each shoe within the sector of its contact surface being provided with a web in the region of the pivotal anchorage of the preceding shoe, said web extending radially inwardly further than the axis of the pivotal anchorage of said preceding shoe and overlapping said mount in the region of said pivotal anchorage.

16. A friction brake including a rotatable brake drum, a mount, and a plurality of brake shoes, at least three in number, positioned successively in substantially the same rotational path and having arcuate contact portions for engagement with said drum, each of said shoes having a pivot arm pivotally connected by an anchor pin to said mount within the sector of the contact portion of the succeeding shoe, each of said shoes also having within the sector of its contact portion an inwardly extending web overlapping the pivotal connection of the preceding shoe and engaging the end of its anchor pin to resist axial motion of said pin in the direction of said web.

17. A brake including a rotatable brake drum, a mount, and at least three brake shoes having contact portions positioned successively in substantially the same circumferential path for engagement with said drum, each of said shoes also having a pair of spaced arms pivotally connected to said mount within the sector of the contact portion of a succeeding shoe, said arms straddling said mount adjacent said pivotal connection, each of said shoes also having a pair of web members spaced somewhat more apart than said arms and extending inwardly so that the web members of each shoe partially straddle said mount and also straddle the pivotal connection and arms of a preceding shoe.

GUSTAV MATTERSDORF.